A. JENSÈN & P. NIELSÉN.
FRICTION GEARING.
APPLICATION FILED NOV. 12, 1912.
1,058,981.
Patented Apr. 15, 1913.
3 SHEETS—SHEET 1.
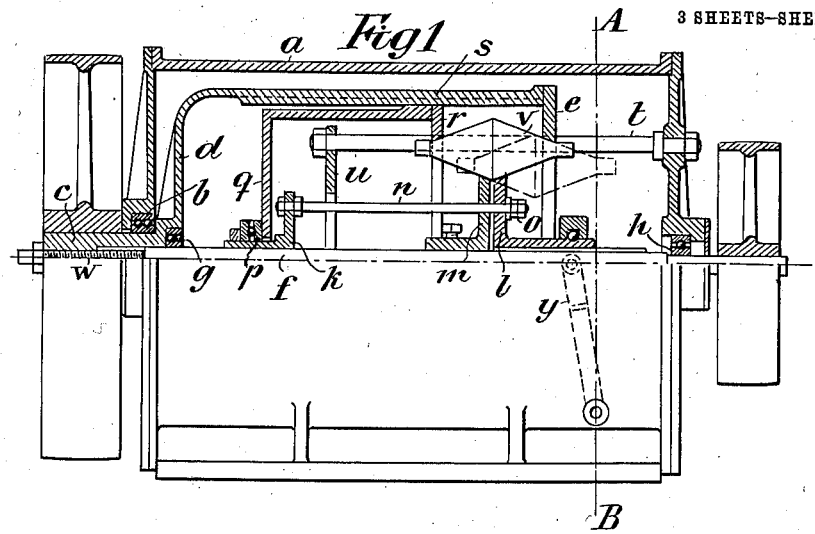
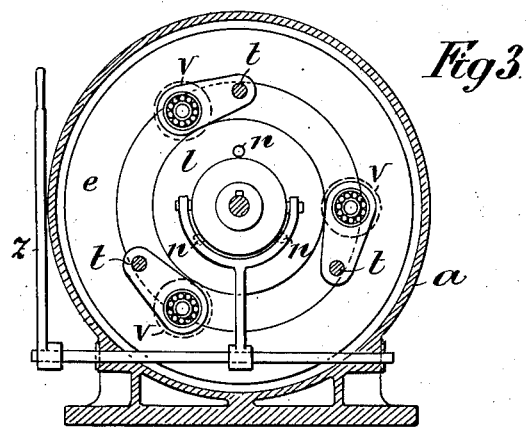
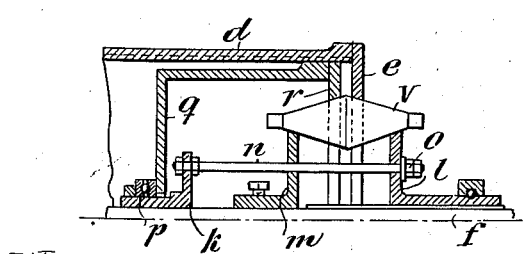
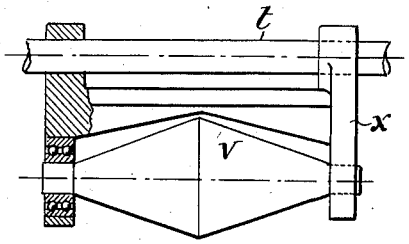
Witnesses
Inventors
Anders Jensèn and Peder Nielsén
By Attorney

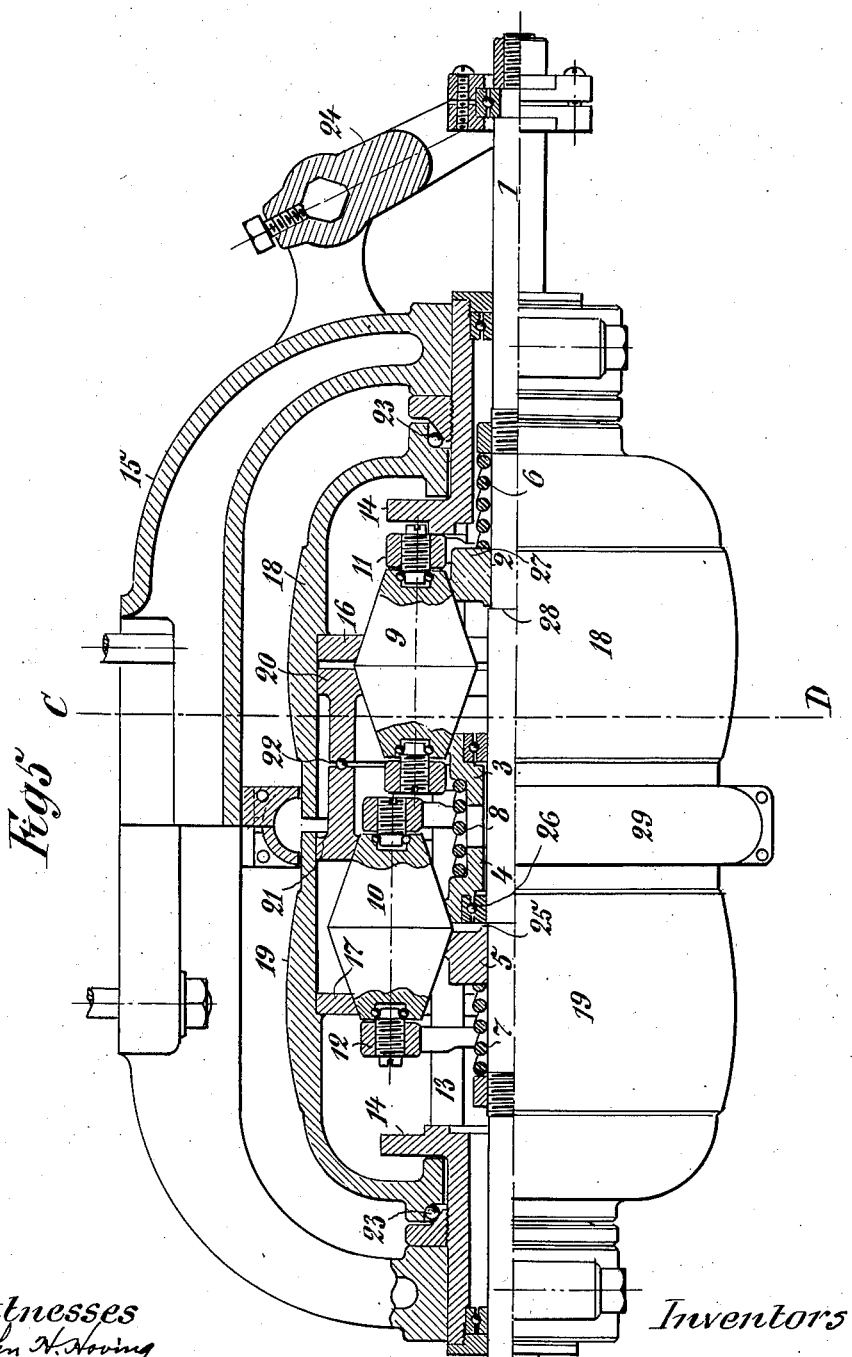

A. JENSEN & P. NIELSÉN.
FRICTION GEARING.
APPLICATION FILED NOV. 12, 1912.
1,058,981.
Patented Apr. 15, 1913.
3 SHEETS—SHEET 3.
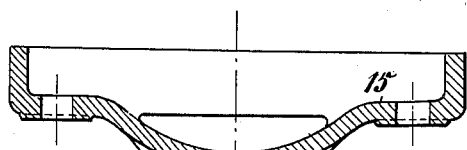
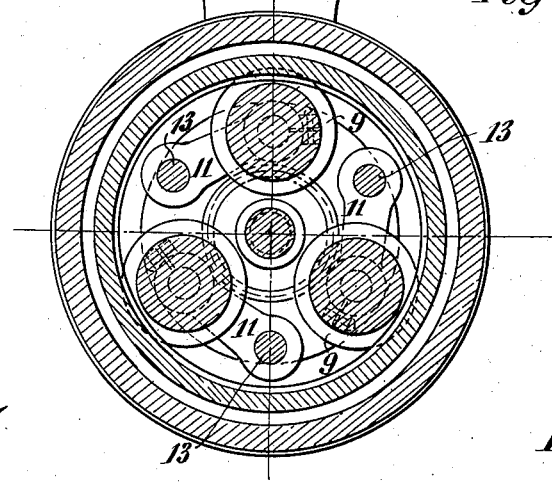
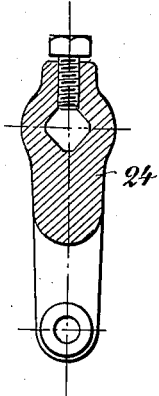
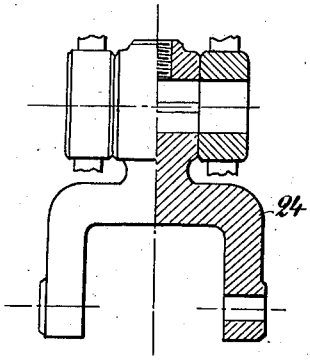
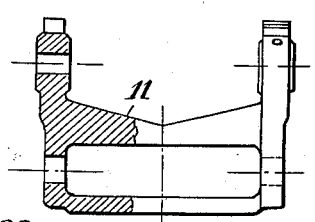
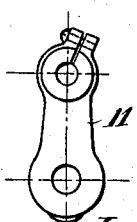
Witnesses
Inventors
Anders Jensèn and Peder Nielsén
By Attorney

_UNITED STATES PATENT OFFICE._

ANDERS JENSÈN, OF NÖRRESUNDBY, AND PEDER NIELSÉN, OF BRÖNDERSLEV, DENMARK, ASSIGNORS TO FIRM OF SKANDINAVISK STAABREMSKIVEFABRIK VED J. C. MARTINS, OF COPENHAGEN, DENMARK.

FRICTION-GEARING.

1,058,981. Specification of Letters Patent. Patented Apr. 15, 1913.

Application filed November 12, 1912. Serial No. 730,954.

_To all whom it may concern:_

Be it known that we, ANDERS JENSÈN and PEDER NIELSÉN, subjects of the King of Denmark, residing, respectively, at Nörresundby and Brönderslev, Denmark, have invented a new and useful Improvement in Friction-Gearing; and we do hereby declare the following to be a full, clear, and exact description of the same.

Friction gearings in which is employed a so-called planet wheel system of the kind in which the planet wheels, having the shape of double cones, roll on fixed outer rings on one side, while the planet wheel carrier is placed on one shaft end, and on conical inner disks or flanges which are connected with the other shaft end, are known. In such gears whether one or the other shaft end is driving or driven, depends upon whether the speed is required to be augmented or diminished.

According to the present invention the known construction is now modified thereby, that it is the planet wheel carrier which is fixed, and the outer rings are movable and connected with one shaft end, while the inner disks, as hitherto, are connected with the other shaft end. It is hereby attained that the apparatus with the same dimensioning of the parts can render a considerably greater range of gearing and the device for afterward tightening and for the regulation of the friction and the device effecting alteration of the gearing are considerably simplified through the new construction.

The invention is shown in the drawings where—

Figure 1 shows a longitudinal section of one half of the gearing, Fig. 2 a detail with the parts in a different position than that shown in Fig. 1, Fig. 3 a cross section of the apparatus on the line A—B, Fig. 1, Fig. 4 a double cone with its movable bearing drawn to a larger scale, Fig. 5 a duplex form of an apparatus according to the invention in partial longitudinal section, Fig. 6 a section on the line C—D, Fig. 5, and Figs. 7–10 some details.

The apparatus shown in Fig. 1 is built in an outer casing $a$, which is fixed and may contain oil, so that the inner parts are kept well lubricated. The casing $a$ carries a bearing $b$ for the one shaft end $c$, which carries for instance a pulley. The shaft $c$ is cast integral with a casing $d$, which carries the one conical outer ring $e$. The end of the other shaft $f$ is journaled in a bearing $g$ in the casing $d$, and in a bearing $h$ in the casing $a$. The shaft $f$ carries three flanges $k$, $l$ and $m$, the two first named of which are displaceable, while the third is screwed thereon. However, the shaft is by a groove and tongue connection with the flange $l$ forced to follow the revolution of the other flanges. The flanges $l$ and $k$ are connected by three longitudinal bolts $n$ the effective length of which can be altered a little by adjustable nuts $o$ with counter-nuts. The boss of the disk $k$ carries outside a thrust bearing $p$ for a bell-shaped capsule $q$, which carries the other conical outer ring $r$. The capsule $q$ is by a groove and tongue connection $s$ forced to follow the revolutions of the casing $d$. The casing $a$ carries three pillars $t$, the other free ends of which are connected by a plate-ring $u$. The double conical hard steel-bodies $v$, which roll partly in the rings $e$ and $r$ and partly on the circumference of the disks $l$ and $m$, are journaled in separate brackets $x$, Fig. 4, which are revoluble about the pillars $t$. The boss of the flange $l$ is acted upon for displacement upon the shaft $f$ by a fork $y$ on a cross shaft journaled in the casing $a$, which cross shaft also carries the lever $z$, which can be actuated by hand. In the shaft $c$ is a pointed screw $w$ which rests against the end of the shaft $f$, the bearing $h$ of which in the casing $a$ must permit of a slight axial displacement of the shaft.

In the position of the parts shown in Fig. 1 the gear is adjusted so as to render the greatest speed to the shaft $f$. If for instance the shaft $c$ is driven, the casings $d$ and $q$ follow the revolution of the same and drive the journaled double conical bodies $v$ through friction between the same and the conical edges of the rings $e$ and $r$, and the bodies $v$ are touched on a small diameter so that they will make the greatest possible number of revolutions for each revolution of the shaft $c$. The bodies $v$ are, however, with their greatest circumferential diameter resting against the circumference of the disks $l$ and $m$, so that these are also driven with the greatest possible circumferential speed, and thus the shaft $f$ with the fixed pulley is driven with the greatest possible speed. If now by means of the hand lever $z$ and the fork $y$ the disk $l$ is displaced to the right, the flange $k$ with the capsule $q$ will likewise be carried to the right, and the parts will at length assume the position shown in Fig. 2, in which the bodies $v$ will roll with the greatest circumference on the rings $e$ and $r$, and with the smallest on the disks $l$ and $m$, so that the gearing in this position of the parts becomes the smallest possible, and it is obvious that the gearing in the intermediate positions of the rings and the disks causes intermediate speed. During this displacement of the disks and the capsule $q$ the bodies $e$ must be somewhat nearer to the shaft $f$, which is effected by the brackets $x$, Fig. 4, turning around the pillars $t$. If the screw $w$ is tightened, thereby displacing the shaft $f$ and the thereon fixed disks $m$ a little to the right, the planes of the ring $e$ and the disk $m$ will approach each other, and if the nuts $o$ are tightened a little, the same will be the case with the rings $r$ and the disk $l$. It is thus possible to adjust the friction between the bodies and their running surfaces according to the proportion of power to be transmitted. It is obvious that the difference between the number of revolutions of the two shafts increases more, when the carrier of the planet-wheel stands still than when the same takes part in the rotation, and the outer ring or the sun wheel stand still.

The modification shown in Figs. 5–10 differs from the one described above inasmuch as two sets of double conical bodies are used, whereby a considerable variation of the gearing can be obtained, and the capsules in which the bodies are contained here themselves form the pulley. The shaft 1 carries the flanges 2, 3, 4 and 5, of which the flanges 2 and 5 are connected with the shaft by means of groove and tongue connection, while the flanges 3 and 4 are constrained to rotate together. The flanges 2 and 5 are acted upon by the springs 6 and 7, and the spring 8 tends to press the flanges 3 and 4 from each other. The double conical bodies 9 and 10 are journaled in brackets 11 and 12, one of which is shown separately in Figs. 9 and 10, and these brackets are fitted pivotally on fixed bolts 13, arranged in two fixed flanges 14, Fig. 5, which are carried by the bracket or frame 15. The outer rings 16 and 17 are fixedly arranged in the capsules 18 and 19 forming pulleys, and the rings 20 and 21 which are displaceable, but through groove and tongue connections (not shown) are forced to follow the revolution of the capsules 18 and 19 respectively. Between the rings 20 and 21 are arranged a series of balls 22. The capsules 18 and 19 are at the ends supported by ball bearings 23. The shaft 1 can by means of a fork 24 (Figs. 5, 7 and 8) be longitudinally displaced.

This apparatus acts in the following manner: When the parts assume the position shown and the capsule 18 is turned at a certain speed, the flange 2 and the shaft 1 will be turned at less speed, dependent upon the diameters of the zones on the double conical bodies 9 on which the rings roll. The flanges 3, 4 and 5 follow the revolutions of the shaft 1, and the motion is through the flanges 4 and 5 and the bodies 10 and 11 transmitted to the capsule 19 with a relative speed which is dependent upon the diameters of the active zones on the bodies 10. Thus an extensive variation of speed is obtained between the pulleys or the capsules 18 and 19. If now the shaft 1 is displaced to the left, the flanges 2 and 5 will likewise be displaced to the left, and the brackets 11 and 12 will turn and be somewhat displaced on the bolts 13, the distances of the double conical bodies from the shaft 1 being somewhat altered. The rings 20 and 21 will likewise be displaced to the left in Fig. 5. At a certain position of the shaft 1 the capsules or pulleys 15 and 19 will rotate at the same speed, and through a further displacement to the left the speed of the capsule 19 will become greater than that of the capsule 18. The springs 6, 7 and 8 effect and maintain a suitable friction between the bodies 9 and 10 and the flanges and rings in question, and when the shaft is moved completely to the right, a small projection 25 on the flange 5 will touch the inner ring of the ball bearing 26, so that the friction between the flange 4 and the bodies 10 ceases, and at the same time the spring 6 is compressed by the projection 27 on the flange 2 being actuated by a shoulder 28 on the shaft 1, so that free running or releasing of the pulleys is permitted. 29 is an annular groove or screen for catching oil which might be hurled out.

Having now particularly described and ascertained the nature of the said invention, what we claim and desire to secure by Letters Patent of the U. S. America is:

1. In a friction gearing, the combination of a fixed support; a driving shaft; a driven shaft; a plurality of double conical bodies rotatably secured to the fixed support so as to permit movement toward the axes of said shafts and so as to be held against revolution around said axes; rings secured to one shaft and engaging one part of said bodies; rings secured to the other shaft and engaging another part of said bodies; and means for bringing about relative movement between said bodies and rings for causing the rings to engage parts of the bodies having different diameters.

2. In friction gearing, the combination of a fixed support; a driving shaft; a driven shaft; a double conical body held against revolution around the axes of said shaft; and rings secured to said shafts respectively and engaging different parts of said bodies; and means for causing relative longitudinal movement between the rings and cones.

In witness whereof, we have subscribed our signatures, in the presence of two witnesses.

ANDERS JENSÈN.
PEDER NIELSÉN.

Witnesses:
 VIGGO BLOM,
 CECIL VILHELM SCHOU.